(12) United States Patent
Rangarajan et al.

(10) Patent No.: US 7,570,628 B2
(45) Date of Patent: Aug. 4, 2009

(54) METHODS AND APPARATUS FOR PROVIDING A DYNAMIC ON-DEMAND ROUTING PROTOCOL

(75) Inventors: Anand Rangarajan, Hillsboro, OR (US); W. Steven Conner, Portland, OR (US); Mark D. Yarvis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 11/124,004

(22) Filed: May 6, 2005

(65) Prior Publication Data

US 2006/0268727 A1 Nov. 30, 2006

(51) Int. Cl.
*H04L 12/28* (2006.01)
(52) U.S. Cl. .................................... 370/351
(58) Field of Classification Search ......... 370/229–231, 370/277, 310, 312–313, 328, 329, 351, 356, 370/389–392, 400, 401; 709/241–243
See application file for complete search history.

(56) References Cited

U.S. PATENT DOCUMENTS

| | | | |
|---|---|---|---|
| 6,954,435 B2 * | 10/2005 | Billhartz et al. | 370/252 |
| 7,280,483 B2 * | 10/2007 | Joshi | 370/238 |
| 7,349,360 B2 * | 3/2008 | Gutierrez et al. | 370/315 |
| 7,382,734 B2 * | 6/2008 | Wakumoto et al. | 370/248 |
| 2004/0246935 A1 * | 12/2004 | Joshi et al. | 370/338 |
| 2005/0286426 A1 * | 12/2005 | Padhye et al. | 370/238 |
| 2006/0153081 A1 * | 7/2006 | Simonsson et al. | 370/238 |

OTHER PUBLICATIONS

Boukerche, Azzedine, Performance Evaluation of Two Congestion Control Mechanism with On-Demand Distance Vector (AODV) Routing.
Goff, Tom et al., "Preemptive routing in ad hoc networks," Journal of Parallel and Distributed Computing, vol. 63, No. 2, Feb. 2003, pp. 123-140, XP004424085.
Kim, Min-Su et al., "A Modified AODV Protocol with Multi-paths Considering Classes of Services," APCC/MDMC '04, 2004, pp. 1159-1168, XP019006745.
Motegi, Shinji et al., "AODV—Based Multipath Routing Protocol for Mobile Ad Hoc Networks," IEICE Transactions on Communication, Communications.
Tang, Suhua et al., "A Robust AODV Protocol With Local Update," Communications, 2004 and the 5th International Symposium on Multi-Dimensional Mobile.
Zhong, Xiaofeng et al., "Stable Enhancement of AODV Routing Protocol," The 14th IEEE 2003 International Symposium on Personal, Indoor and Mobile Radio Communication.

(Continued)

*Primary Examiner*—Dmitry Levitan
(74) *Attorney, Agent, or Firm*—Schwabe, Williamson & Wyatt, P.C.

(57) ABSTRACT

Embodiments of methods and apparatus for providing a dynamic on-demand routing protocol are generally described herein. In some embodiments, a method is disclosed comprising receiving, by a destination node, a first route request from a source node over a plurality of routes between the source node and the destination node, and selecting, by the destination node, a first route and a second route from the plurality of routes as a current route and a candidate route, respectively. Other embodiments may be described and claimed.

10 Claims, 11 Drawing Sheets

OTHER PUBLICATIONS

Yarvis, et al. "Real-World Experiences with an Interactive Ad Hoc Sensor Network", 2002 IEEE, Proc. of the Int'l. Conf. on Parallel Processing Workshops, whole document.

De Couto, et al. "A High-Throughput Path Metric for Multi-Hop Wireless Routing", MobiCom '03, Sep. 14-19, 2003, San Diego, CA, whole document.

Draves, et al. "Routing in Multi-Radio, Multi-Hop Wireless Mesh Networks", MobiCom '04, Sep. 26-Oct. 1, 2004, Philadelphia, PA, whole document.

Conner, et al, "Multichannel Mesh Network, Multichannel Mesh Router and Methods for Routing Using Bottleneck Channel . . . ", U.S. Appl. No. 11/030,592, filed Jan. 4, 2005.

Yarvis, et al, "Multichannel Mesh Router and Methods for Path Selection in a Multichannel Mesh Network", U.S. Appl. No. 11/030,593, filed Jan. 4, 2005.

Connor, et al. "Methods and Apparatus for Distributing Likn-State Information Associated With a Wireless Mesh Network", U.S. Appl. No. 11/025,612, filed Dec. 29, 2004.

Yarvis, et al, "Methods and Apparatus for Providing a Transparent Bridge Associated With a Wireless Mesh Network", U.S. Appl. No. 11/030,523, filed Jan. 5, 2005.

Connor, et al, "Methods and Apparatus for Identifying a Distance-Vector Route Associated With a Wireless Mesh Network", U.S. Appl. No. 11/030,016, filed Jan. 5, 2005.

* cited by examiner

METHODS AND APPARATUS FOR PROVIDING A DYNAMIC ON-DEMAND ROUTING PROTOCOL

TECHNICAL FIELD

The present disclosure relates generally to wireless communication systems, and more particularly, to methods and apparatus for providing a dynamic on-demand routing protocol associated with a wireless mesh network.

BACKGROUND

As wireless communication becomes more and more popular at offices, homes, schools, etc., the demand for resources may cause network congestions and slowdowns. To reduce performance degradations and/or overload conditions, a wireless mesh network may be implemented in a wireless communication system. In particular, a wireless mesh network may include two or more nodes. If one node fails to operate properly, the remaining nodes of a wireless mesh network may still be able to communicate with each other either directly or through one or more intermediate nodes. Accordingly, a wireless mesh network may provide multiple paths for a transmission to propagate from the source to the destination. Thus, a wireless mesh network may be a reliable solution to support the increasing demand for wireless communication services.

DETAILED DESCRIPTION

In general, methods and apparatus for providing a dynamic on-demand routing protocol associated with a wireless mesh network are described herein. The methods and apparatus described herein are not limited in this regard.

Figure 1:
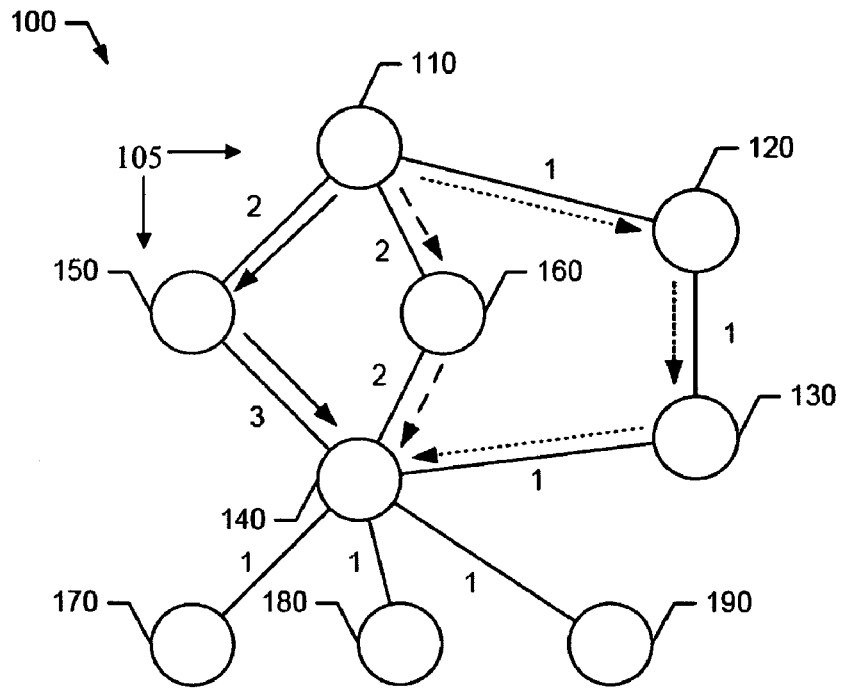
FIG. 1 is a schematic diagram representation of an example wireless communication system according to an embodiment of the methods and apparatus disclosed herein.

Referring to FIG. 1, an example wireless mesh network 100 including a plurality of mesh nodes 105, generally shown as 110, 120, 130, 140, 150, 160, 170, 180, and 190, is described herein. In one example, the wireless mesh network 100 may be an extended service set (ESS) mesh network based on developments by the Institute of Electrical and Electronic Engineers (IEEE). Although FIG. 1 depicts nine mesh nodes, the wireless mesh network 100 may include additional or fewer mesh nodes.

As described in detail below, the plurality of nodes 105 may include access points, redistribution points, end points, and/or other suitable connection points for traffic flows via routes having multiple hops. Accordingly, the wireless mesh network 100 may be implemented to provide a wireless personal area network (WPAN), a wireless local area network (WLAN), a wireless metropolitan area network (WMAN), a wireless wide area network (WWAN), and/or other suitable wireless communication networks.

The plurality of mesh nodes 105 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other and/or station(s) (not shown) associated with the wireless mesh network 100. For example, the plurality of mesh nodes 105 may implement OFDM modulation to transmit large amounts of digital data by splitting a radio frequency signal into multiple small sub-signals, which in turn, are transmitted simultaneously at different frequencies. In particular, the plurality of mesh nodes 105 may use OFDM modulation as described in the 802.xx family of standards developed by IEEE and/or variations and evolutions of these standards (e.g., 802.11, 802.15, 802.16, etc.) to communicate via wireless link(s) (e.g., forward data within the wireless mesh network 100). The plurality of mesh nodes 105 may also operate in accordance with other suitable wireless communication protocols that require very low power such as Bluetooth, Ultra Wideband (UWB), and/or radio frequency identification (RFID) to communicate via wireless link(s).

The plurality of nodes 105 may also operate in accordance with one or more of several wireless communication protocols to communicate with other wireless devices (e.g., a laptop computer, a handheld computer, a tablet computer, a cellular telephone a wireless peripheral, etc.). In particular, these wireless communication protocols may be based on analog, digital, and/or dual-mode communication system standards such as the Global System for Mobile Communications (GSM) standard, the Frequency Division Multiple Access (FDMA) standard, the Time Division Multiple Access (TDMA) standard, the Code Division Multiple Access (CDMA) standard, the Wideband CDMA (WCDMA) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards.

Further, the plurality of nodes 105 may communicate with other components associated with the wireless mesh network 100 such as WPAN, WLAN, WMAN, and/or WWAN devices (not shown) including network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system.

In a communication network, a routing protocol such as the Ad-Hoc On-Demand Distance Vector (AODV) protocol developed by the Internet Engineering Task Force (published 2003) may be used to identify high performance, end-to-end routes between nodes. Typically, the AODV protocol may identify a path with the lowest latency as the optimal route between two nodes (e.g., based on hop count). For example, the AODV protocol may identify a path with the least number of hops between the two nodes as the optimal route. However, the shortest path between two nodes may not be the optimal route. Further, a path previously selected as optimal may not remain optimal because conditions of a wireless environment may vary over time (e.g., a dynamic environment). In the wireless mesh network 100, for example, link conditions of a path may vary such that the path may be the optimal route between two nodes for a period of time but another path may be the optimal route at another period of time.

Figure 2:
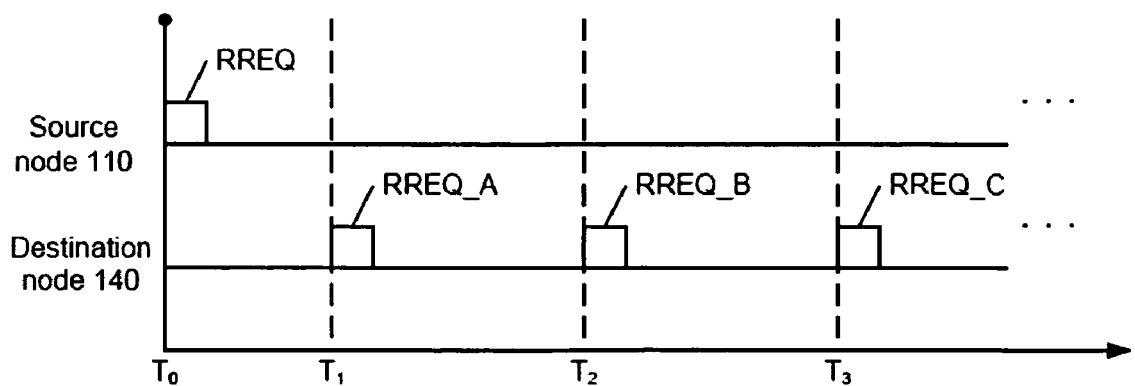
FIG. 2 is a timing diagram representation of one manner in which the example wireless mesh network of FIG. 1 may operate.

In general, the methods and apparatus described herein may identify an optimal route between two or more nodes and maintain the optimal route based on metric information of paths linking the nodes to reduce transmission overhead. For example, metric information may include information associated with characteristics and/or conditions of a link between two nodes such as data throughput, number of transmissions, load, interference and/or other suitable link information. To determine a route to a destination node on an on-demand basis, a source node may generate a route request (RREQ) if the source node does not have a pre-existing route to the destination node. In one example, the mesh node 110 (e.g., the source node) may have data to be transmitted to the mesh node 140 (e.g., the destination node). If the source node 110 does not have a pre-existing route to the destination node 140, the source node 110 may generate and transmit a RREQ to neighboring nodes 120, 150, and 160 of the source node 110 via a broadcast transmission at time $T_0$ to identify a route as shown in FIG. 2.

The RREQ may traverse through one or more paths to reach the destination node 140 from the source node 110. In particular, the destination node 140 may receive the RREQ via a path through the mesh node 150 (e.g., Path A, which includes links generally shown as solid lines). The destination node 140 may also receive the RREQ via a path through the mesh node 160, generally shown as dash lines (e.g., Path B, which includes links generally shown as dash lines). Further, the destination node 140 may receive the RREQ via a path through the mesh nodes 120 and 130 (e.g., Path C, which includes links generally shown as dotted lines).

In one example, the destination node 140 may receive the RREQ via Path A at time $T_1$ (RREQ_A). Path A may include a link between the source node 110 and the mesh node 150 (e.g., link 110-150) and a link between the mesh node 150 and the destination node 140 (e.g., link 150-140). The link 110-150 may have a metric value of two (2) and the link 150-140 may have a metric value of three (3) for a total metric value of five (5) for Path A. In response to receipt of the RREQ via Path A, the destination node 140 may create a route to the source node 110 through the mesh node 150. The destination node 140 may generate and transmit a route reply (RREP) to the source node 110 via a unicast transmission through the mesh node 150 to establish the route. As a result, Path A may be the current route from the destination node 140 to the source node 110.

The destination node 140 may receive the RREQ via Path B at time $T_2$ (RREQ_B) subsequent to receiving the RREQ via Path A at time $T_1$. Path B may include a link between the source node 110 and the mesh node 160 (e.g., link 110-160) and a link between the mesh node 160 and the destination node 140 (e.g., link 160-140). Both link 110-160 and link 160-140 may have a metric value of two (2) for a total metric value of four (4) for Path B. When the destination node 140 receives the RREQ via Path B, the destination node 140 may compare the total metric values of Paths A and B to determine an optimal route to the source node 110 (e.g., either Path A or Path B). Based on the total metric values of Paths A and B (e.g., a total metric value of five versus a total metric value of four, respectively), the destination node 140 may determine that Path B may be a more optimal route than Path A for a particular period of time. Accordingly, the destination node 140 may generate and transmit a RREP to the source node 110 via a unicast transmission through the mesh node 160. As a result, Path B may replace Path A as the current route from the destination node 140 to the source node 110.

The destination node 140 may receive the RREQ via Path C at time $T_3$ (RREQ_C) subsequent to receiving the RREQ via Path B at time $T_2$. Path C may include a link between the source node 110 and the mesh node 120 (e.g., link 110-120), a link between the mesh nodes 120 and 130 (e.g., link 120-130), and a link between the mesh node 130 and the destination node 140 (e.g., link 130-140). Each of the link 110-120, link 120-130, and link 130-140 may have a metric value of one (1) for a total metric value of three (3) for Path C. In response to receiving RREQ_C, the destination node 140 may compare the total metric values of Paths B and C to determine the optimal route to the source node 110 (e.g., either Path B or Path C). Based on the total metric values of Paths B and C (e.g., a metric value of four versus a metric value of three, respectively), the destination node 140 may determine that Path C may be a more optimal route than Path B for a particular period of time. Accordingly, the destination node 140 may generate and transmit a RREP to the source node 110 via a unicast transmission through the mesh nodes 120 and 130. As a result, Path C may replace Path B as the current route from the destination node 140 to the source node 110.

As described in the above examples, the methods and apparatus described herein may identify the optimal route based on metric information associated with the wireless mesh network 100. However, link characteristics and/or conditions of the wireless mesh network 100 may vary over time. For example, a particular path may initially be the optimal route between the source node and the destination node but that same path may not be the optimal route between the two nodes at a later time. A variety of wireless environment characteristics and/or conditions may cause the total metric value of a particular path to increase. Thus, the methods and apparatus described herein may also maintain the optimal route between the source node and the destination node based on metric information as the wireless environment changes.

Figure 3:
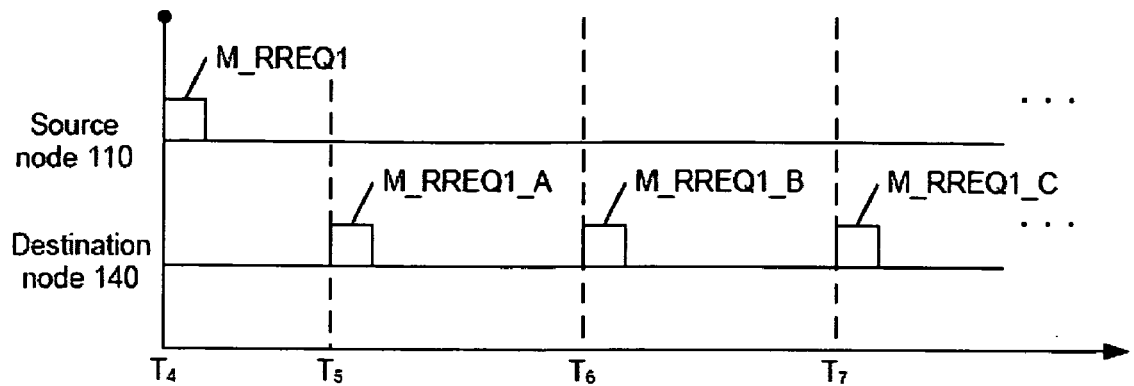
FIG. 3 is a timing diagram representation of another manner in which the example wireless mesh network of FIG. 1 may operate.

To maintain an optimal route between the source node 110 and the destination node 140, the source node 110 may generate and broadcast a RREQ on a periodic basis (e.g., maintenance RREQs). In the example of FIG. 3, the source node 110 may generate and transmit a first maintenance RREQ (M_RREQ1) to the mesh nodes 130, 150, and 160 via a broadcast transmission at time $T_4$. The destination node 140 may receive the RREQ via Path A at time at time $T_5$ (M_RREQ1_A), via Path B at time at time $T_6$ (M_RREQ1_B), and via Path C at time at time $T_7$ (M_RREQ1_C).

In response to receipt of the first maintenance RREQ via Path A at time $T_5$, the destination node 140 may compare the sequence number of the first maintenance RREQ received at time $T_5$ with the sequence number of the RREQ received at time $T_3$. Based on the comparison of sequence numbers, the destination node 140 may determine whether to modify the current route to the source node 110 (e.g., Path C) based on the first maintenance RREQ via Path A. If the sequence number of the first maintenance RREQ received at time $T_5$ is not greater than the sequence number of the RREQ received at time $T_3$ by a predefined RREQ loss threshold, the destination node 140 may not modify the current route to the source node 110. The destination node 140 may identify Path A as a candidate route to the source node 110 and initiate a RREQ alarm to determine whether a RREQ via the current route may be lost. In particular, the candidate route may be identified and used by the destination node 140 as the optimal route to the source node 110 if the current route is possibly unavailable. The RREQ alarm may expire after a traversal time threshold, which may be configured as a period for a RREQ to traverse through the wireless mesh network 100 so that the destination node 140 may receive the RREQ from the source node 110 via all paths. For example, the traversal time threshold may be defined so that the destination node 140 may receive the RREQ broadcasted by the source node 110 at time $T_4$ via Paths A, B, and C. Thus, the traversal time threshold may be a period of at least $T_7$-$T_4$.

In response to receiving the first maintenance RREQ via Path B at time $T_6$, the destination node 140 may not modify the current route to the source node 110 because the sequence number of the first maintenance RREQ received at time $T_6$ is not greater than the sequence number of the RREQ received at time $T_3$ by the predefined RREQ loss threshold. However, the destination node 140 may modify the candidate route to the source node 110. Accordingly, the destination node 140 may replace Path A with Path B as the candidate route because Path B may be a more optimal route than Path A to the source node 110 based on the total metric values (e.g., a metric value of four versus a metric value of five, respectively).

In response to receipt of the first maintenance RREQ via Path C at time $T_7$, the destination node 140 may terminate the RREQ alarm for the first maintenance RREQ broadcasted from the source node 110 at time $T_4$ because the destination node 140 received the first maintenance RREQ via the current optimal path. Accordingly, the destination node 140 may generate and transmit a RREP to the source node 110 via Path C.

Figure 4:
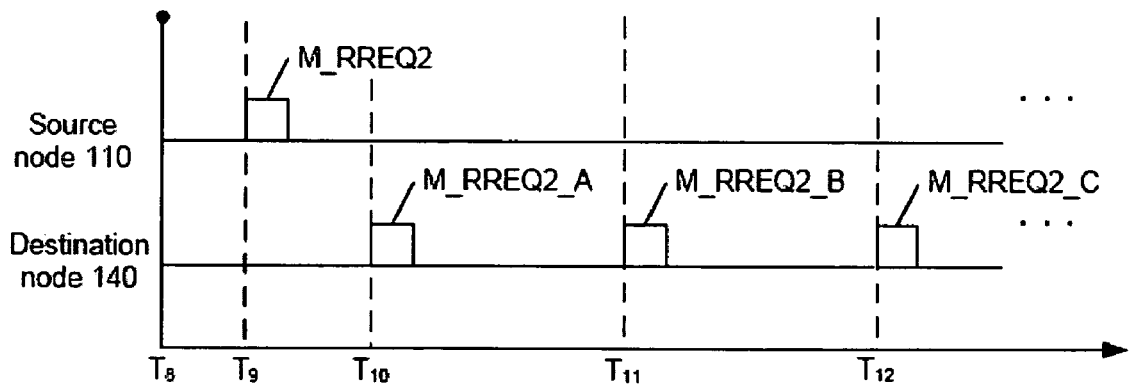
FIG. 4 is a timing diagram representation of yet another manner in which the example wireless mesh network of FIG. 1 may operate.

In the example of FIG. 4, link conditions of the current route (e.g., via Path C) may deteriorate at time $T_8$ such that the metric value of link 110-120 may change from one (1) to four (4) (e.g., a total metric value of five for Path C at time $T_8$). To maintain the optimal route from the destination node 140, the source node 110 may generate and transmit a second maintenance RREQ to neighboring nodes 130, 150, and 160 via a broadcast transmission at time $T_9$ (M_RREQ2). The destination node 140 may receive the second maintenance RREQ via Path A at time $T_{10}$ (M_RREQ2_A), via Path B at time $T_{11}$, (M_RREQ2_B), and via Path C at time $T_{12}$ (M_RREQ2_C).

The destination node 140 may process the second maintenance RREQ received via Paths A and B at time $T_{10}$ and time $T_{11}$, respectively, in a similar manner to the first maintenance RREQ received via Paths A and B at time $T_5$ and time $T_6$, respectively, as described above. Thus, the destination node 140 may use Path B as the candidate route. In response to receipt of the RREQ via Path C at time $T_{12}$, the destination node 140 may terminate the RREQ alarm for the second maintenance RREQ broadcasted from the source node 110 at time $T_9$ because the destination node 140 received the second maintenance RREQ via the current optimal path.

Further, the destination node 140 may determine that the link conditions of the current route (e.g., Path C) have deteriorated with the total metric value increasing from three (3) to six (6). As a result, the destination node 140 may replace the current route with the candidate route (e.g., Path B) as the optimal route to the source node 110 because the total metric value of the candidate route is better than the total metric value of the current route. In particular, the destination node 140 may replace Path C with Path B as the optimal route to the source node 110 because the total metric value of Path B is four (4) whereas the total metric value of Path C is six (6). Accordingly, the destination node 140 may generate and transmit a RREP to the source node 110 via Path B. Thus, Path B may be the optimal route from the destination node 140 to the source node 110.

In another example, the destination node 140 may receive the second maintenance RREQ via Paths A and B at time $T_{10}$ and time $T_{11}$, respectively, but fails to receive the second maintenance RREQ via Path C (e.g., lost). The destination node 140 may process the second maintenance RREQ via Paths A and B at time $T_{10}$ and time $T_{11}$ in a similar manner as described above. In contrast to the above example, the destination node 140 does not terminate the RREQ alarm for the second maintenance RREQ broadcasted from the source node 110 at time $T_9$ because the destination node 140 failed to receive the second maintenance RREQ via current optimal path (e.g., did not receive via Path C). When the RREQ alarm expires (e.g., exceed the traversal time threshold), the destination node 140 may forward the RREQ to other nodes such as nodes 170, 180, and 190. The forwarded RREQ may provide the nodes 170, 180, and 190 with updated information indicative of the current optimal route to the source node 110. The destination node 140 may also generate and transmit a RREP to the source node 110 via Path C.

Figure 5:
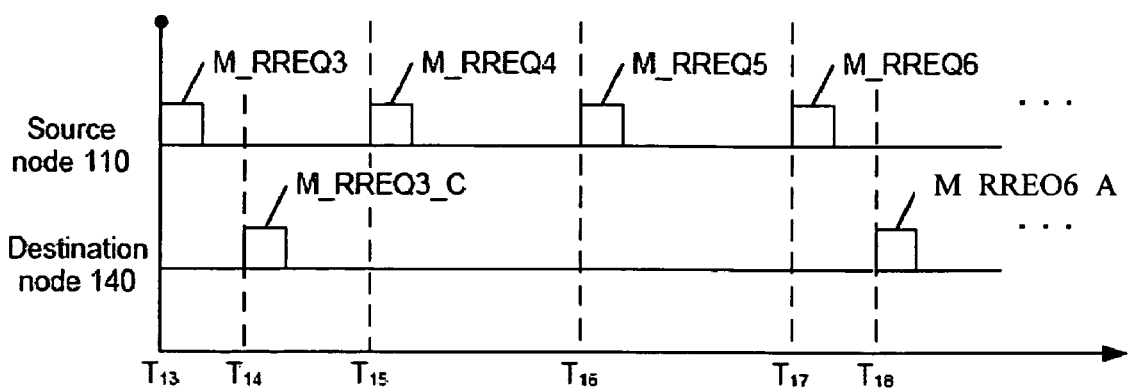
FIG. 5 is a timing diagram representation of yet another manner in which the example wireless mesh network of FIG. 1 may operate.

As noted above, the RREQ loss threshold may be defined to determine whether a particular path may be reliable to operate as the optimal route between the source node 110 and the destination node 140. If the difference between sequence numbers of the last two RREQs received by the destination node 140 via a path is greater than the RREQ loss threshold, the path may not be reliable to operate as the optimal route between the source node 110 and the destination node 140 because too many maintenance RREQs have been lost along that particular path. In the example of FIG. 5, the RREQ loss threshold may be predefined as two, and the destination node 140 may receive a third maintenance RREQ (M_RREQ3) (e.g., a sequence number of three) from the source node 110 via Path C at time $T_{14}$ but a fourth maintenance RREQ (M_RREQ4) and a fifth maintenance RREQ (M_RREQ5) (e.g., sequence numbers of four and five, respectively) generated by the source node 110 at times $T_{15}$ and $T_{16}$, respectively, were lost via Path C. Although Path C may be a more optimal route than Path A (e.g., the total metric value of Path C is less than the total metric value of Path A), the destination node 140 may change the optimal route to the source node 110 from Path C to Path A if the destination node 140 receives a sixth maintenance RREQ (e.g., sequence number of six) from the source node 110 via Path A but not Path C. The difference between sequence numbers of the latest maintenance RREQ (e.g., the sixth maintenance RREQ) received by the destination node 140 (e.g., the sixth maintenance RREQ) and the last maintenance RREQ received by the destination node 140 via Path C is greater than the RREQ loss threshold of two.

To avoid route flapping by incrementing the sequence number of the maintenance RREQs prematurely, the source node 110 may wait for a period of time (e.g., a traversal time period) before incrementing the sequence number so that the destination node 140 may have an opportunity to receive a maintenance RREQ from the source node 110 via all paths. Otherwise, the destination node 140 may switch to a less optimal route prior to receiving the metric information associated with all paths to identify the optimal route. Although certain examples have been described above, the scope of coverage of this disclosure is not limited thereto.

Figure 6:
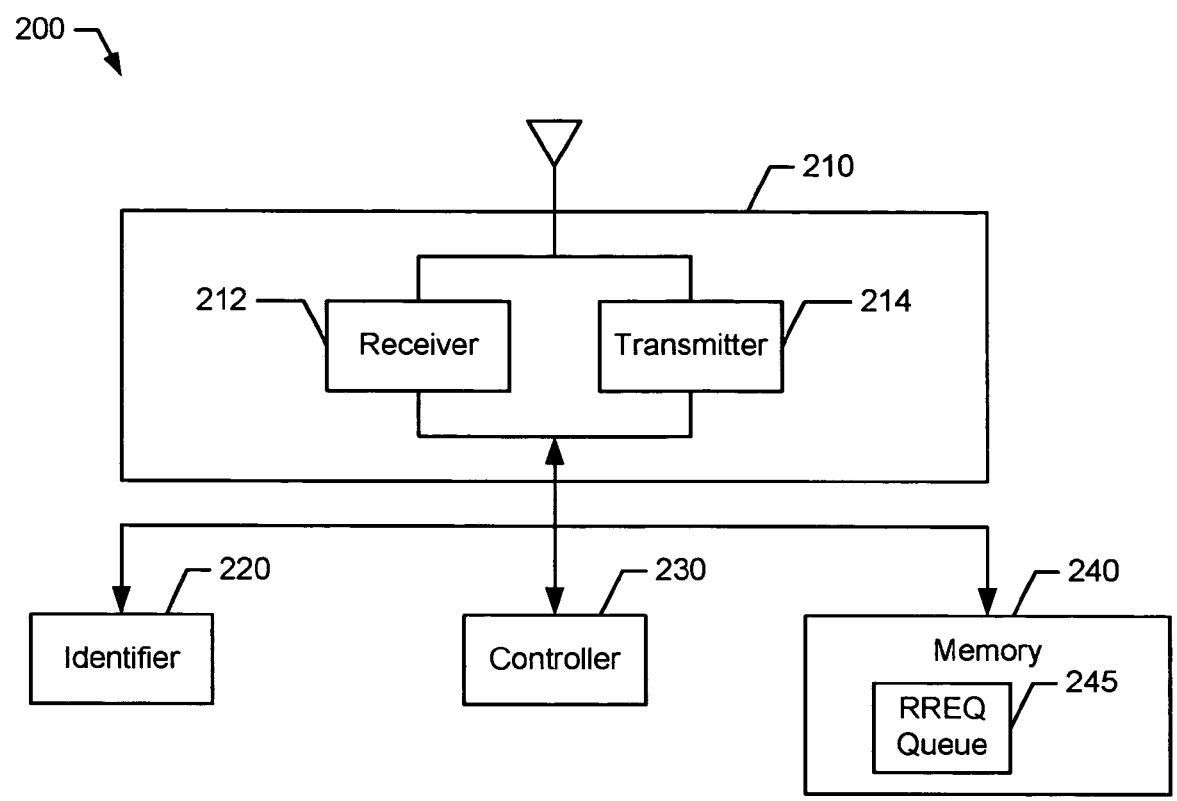
FIG. 6 is a block diagram representation of the example communication node of FIG. 1.

Turning to FIG. 6, an example communication node 200 may include a communication interface 210, an identifier 220, a controller 230, and a memory 240. The communication interface 210 may include a receiver 212 and a transmitter 214. The communication interface 210 may receive and/or transmit data associated with wireless communication networks including mesh networks (e.g., the wireless mesh network 100 of FIG. 1) and/or non-mesh networks. In particular, the receiver 212 may receive address requests/replies from other communication nodes within the same wireless communication network and/or neighboring wireless communication networks. The transmitter 214 may transmit address requests/replies to other communication nodes within the same wireless communication network and/or neighboring wireless communication networks.

The identifier 220, the controller 230, and the memory 240 may be operatively coupled to the communication interface 210. As described in detail below, the identifier 220 may be configured to identify an optimal route associated with two or more nodes based on metric information of one or more paths associated with the nodes. The controller 230 may be configured to maintain the optimal route based on metric information of the one or more paths associated with the nodes.

The memory 240 may be configured to store routing information. In one example, the memory 240 may store a routing table including one or more routing entries. Each routing entry may include information associated with the communication node 200. In particular, each routing entry may indicate a destination node of a path, a sequence number associated with the destination node, a next hop from the communication node 200 to the destination node via the path, the metric of the path to the destination node, and a candidate route from the communication node to the destination node. The next hop may be a neighboring node to which a packet may be forwarded to reach the destination node. The memory 240 may also include a route request (RREQ) queue 245 to store RREQs from different paths.

Figure 7:
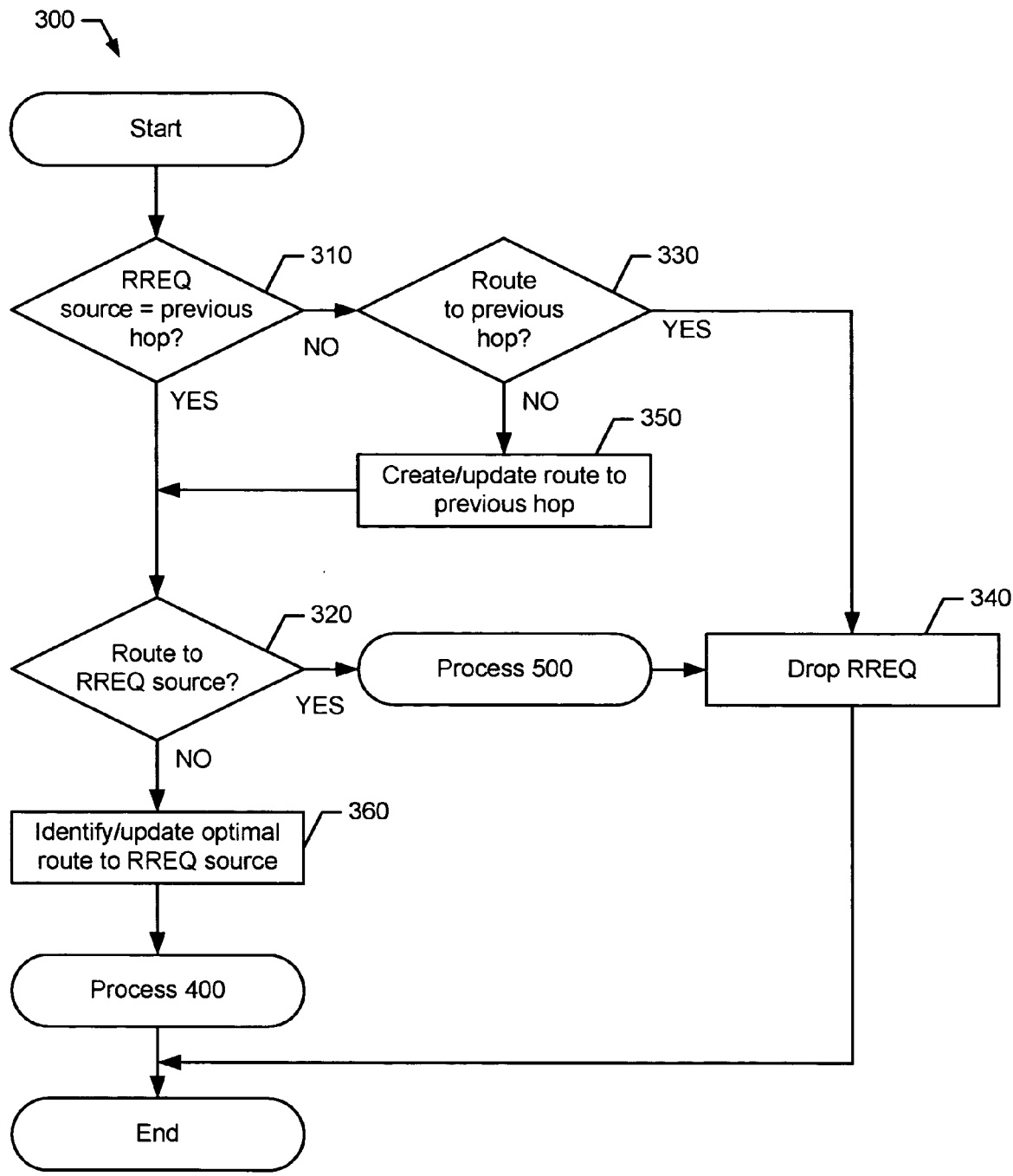
FIG. 7 is a flow diagram representation of one manner in which the example communication node of FIG. 6 may be configured to process a route request.

FIG. 7 depicts one manner in which the mesh nodes of FIG. 1 may be configured to provide a dynamic on-demand routing protocol associated with the wireless mesh network 100. The example process 300 of FIG. 7 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 7, these actions can be performed in other temporal sequences. Again, the example process 300 is merely provided and described in conjunction with the apparatus of FIGS. 1 and 6 as an example of one way to configure the communication node 200 of FIG. 6 to process a route request (RREQ) from a source node.

In the example of FIG. 7, the process 300 may begin with the communication node 200 (e.g., any of the plurality of mesh nodes 105 of FIG. 1) receiving a RREQ from a neighboring node and determining whether the previous hop of the RREQ is the RREQ source (block 310). In particular, the previous hop may be a neighboring node transmitting the RREQ to a particular mesh node (e.g., forwarding the RREQ). For example, the mesh nodes 130, 150, and 160 may be previous hops of a RREQ initiated and generated by the source node 110 relative to the destination node 140. If the previous hop is the RREQ source, the communication node 200 may proceed directly to block 320 to determine whether a route to the RREQ source exists as described in detail below. Otherwise if the previous hop of the RREQ is not the RREQ source, the communication node 200 may determine whether to generate a new route or update a current route to the previous hop (block 330). For example, the destination node 140 may determine whether to generate a new route or update a current route to the mesh node 130. If there is an existing route to the previous hop or if there is no need to update the current route, the communication node 200 may drop the RREQ (block 340) and terminate the process 300.

Otherwise if the communication node 200 determines that there is no route to the previous hop or the route needs to be updated at block 330, the communication node 200 may generate a new route or update the current route to the previous hop, respectively (block 350). Accordingly, the communication node 200 may determine whether a route to the RREQ source exists (block 320). In one example, the destination node 140 may determine whether there is an existing route to the source node 110. If there is no route to the RREQ source, the communication node 200 may identify and/or update the optimal route to the RREQ source based on the RREQ (block 360).

Figure 8:
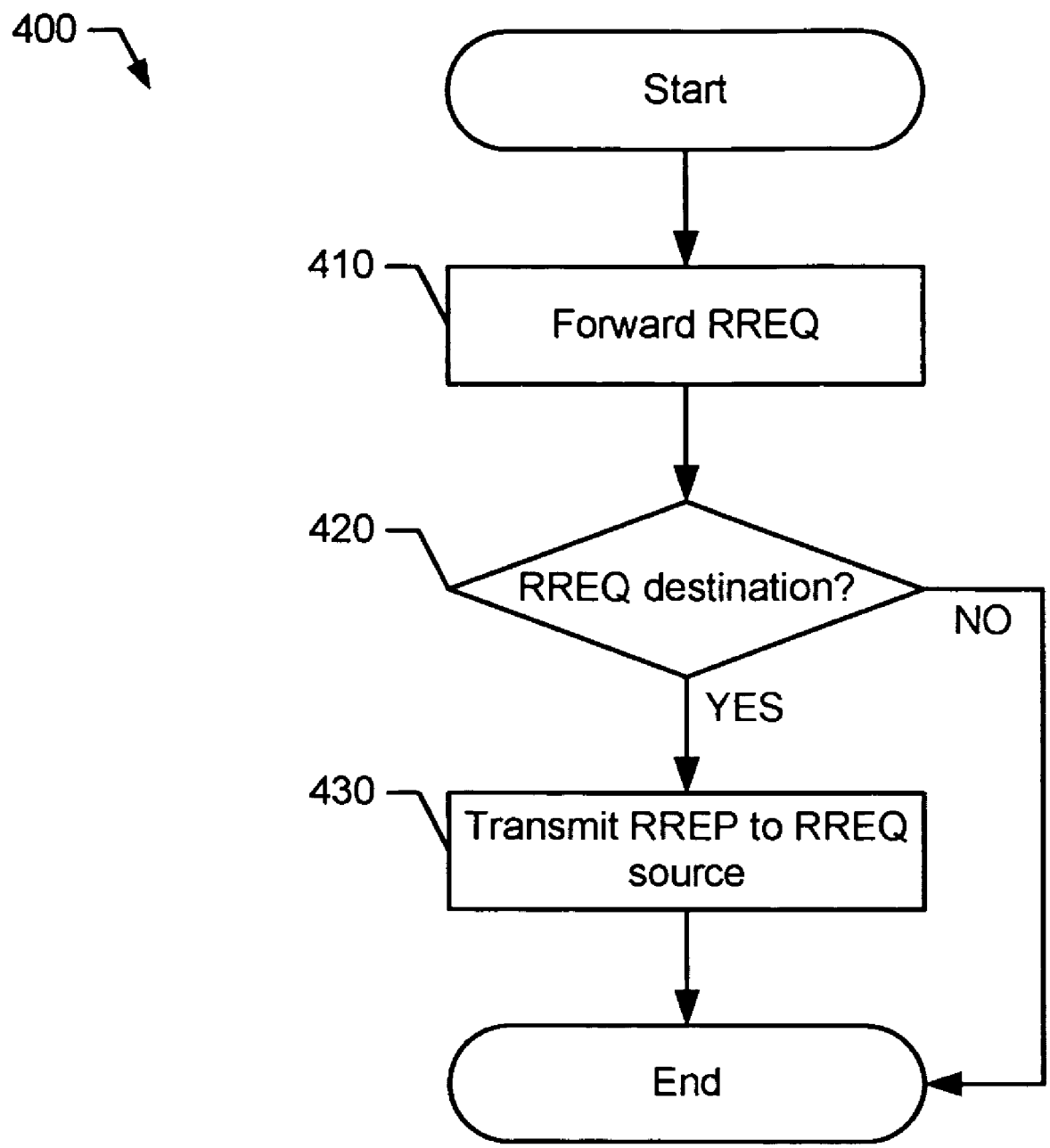
FIG. 8 depicts one manner in which the example communication node of FIG. 6 may be configured to further process the route request.

Accordingly, the communication node 200 may proceed to the process 400 of FIG. 8. In the example of FIG. 8, the process 400 may begin with the communication node 200 forwarding the RREQ to other mesh nodes of the wireless mesh network 100 (block 410). The communication node 200 may determine whether the communication node 200 is the destination node of the RREQ (e.g., RREQ destination) (block 420). In particular, the RREQ may include a destination field indicating the Internet Protocol (IP) address of the destination node to which a route from the source node is desired. Alternatively, the destination field may include a Media Access Control (MAC) address and/or other suitable protocol address of the destination node 140. If the communication node 200 is the RREQ destination (e.g., the destination node 140), the communication node 200 may initiate a route reply (RREP) and transmit the RREP to the RREQ source (e.g., the source node 110) via a unicast transmission (block 430). Accordingly, the communication node 200 may terminate the process 400, and control may return to the process 300, which in turn, may also terminate.

Referring back to block 420, if the communication node 200 is not the RREQ destination, the communication node 200 may proceed to terminate the process 400. As noted above, controls may return to the process 300 so that the communication node 200 may also terminate the process 300.

Figure 9:
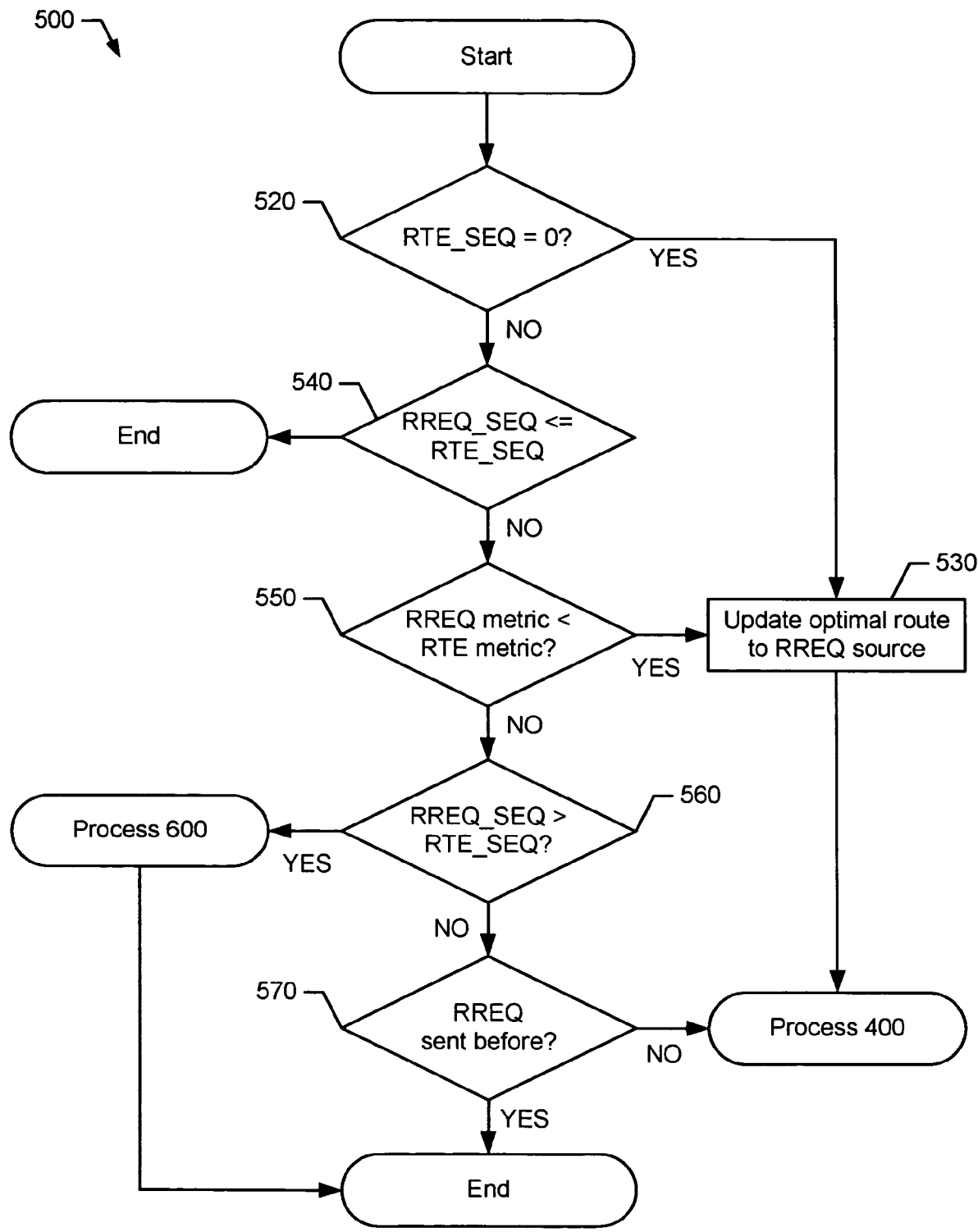
FIG. 9 depicts one manner in which the example communication node of FIG. 6 may be configured to further process the route request.

Turning back to block 320 of FIG. 7, if there is an existing route to the RREQ source (RTE), the communication node 200 may proceed to the process 500 of FIG. 9. In the example of FIG. 9, the process 500 may begin with the communication node 200 determining whether to update the current route to the RREQ source based on the RREQ. In particular, the communication node 200 may determine whether the sequence number of the current route (RTE_SEQ) is equal to zero (block 520). If RTE_SEQ is equal to zero, the communication node 200 may update the current route to the RREQ source based on the RREQ (block 530). Accordingly, the communication node 200 may proceed to the process 400 of FIG. 8 as described above.

Referring again to block 520, if RTE_SEQ is not equal to zero, the communication node 200 may determine whether the RREQ is outdated. In particular, the communication node 200 may determine whether the sequence number of the RREQ (RREQ_SEQ) is less than or equal to the sequence number of the current route (RTE_SEQ) (block 540). If RREQ_SEQ is less than RTE_SEQ, the communication node 200 may terminate the process 500 and control may return to block 340 of FIG. 6 to drop the RREQ. Otherwise, if RREQ_SEQ is not less than RTE_SEQ (e.g., RREQ is newer the current route), the communication node 200 may determine whether the metric value of a route based on the RREQ (e.g., RREQ metric) is less than the metric value of the current route (e.g., RTE metric) (block 550).

If RREQ metric is less than RTE metric at block 550, the communication node 200 may update the current route to the RREQ source based on the RREQ (block 530) and proceed to the process 400 of FIG. 8 as described above. If RREQ metric is greater than or equal to RTE metric at block 550, the communication node 200 may determine whether RREQ_SEQ is greater than RTE_SEQ (block 560). If RREQ_SEQ is greater than RTE_SEQ, the communication node 200 may proceed to process 600 of FIG. 10 as described in detail below.

Figure 10:
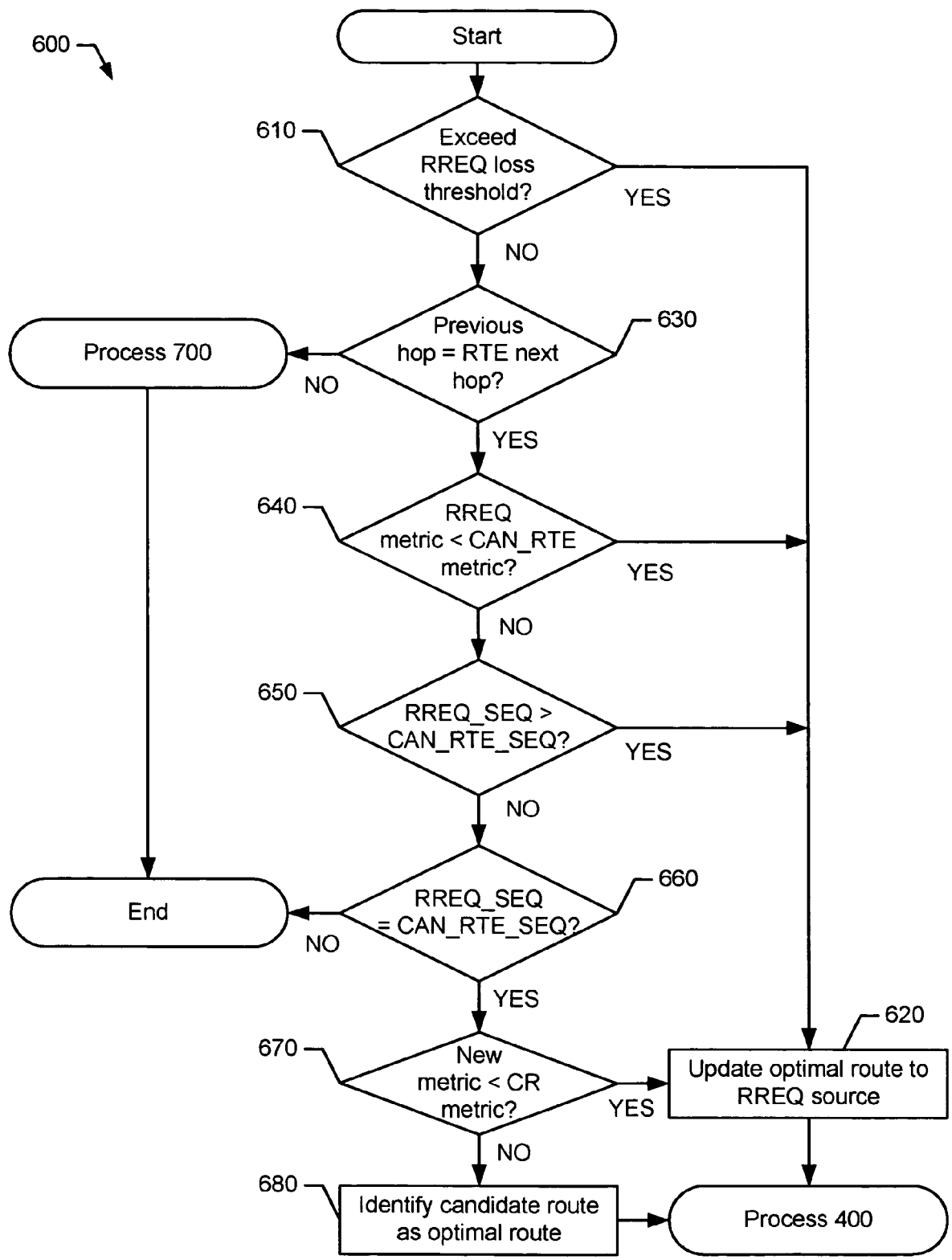
FIG. 10 depicts one manner in which the example communication node of FIG. 6 may be configured to further process the route request.

In the example of FIG. 10, the process 600 may begin with the communication node 200 determining whether RREQ_SEQ is greater than RTE_SEQ by the RREQ loss threshold (block 610). If RREQ_SEQ is greater than RTE_SEQ by the RREQ loss threshold, the communication node 200 may update the current route to the RREQ source based on the RREQ (block 620) and proceed to the process 400 of FIG. 4 as described above. Otherwise if RREQ_SEQ is not greater than RTE_SEQ by the RREQ loss threshold, the communication node 200 may determine whether the previous hop is the next hop of the current route to the RREQ source (block 630).

Figure 11:
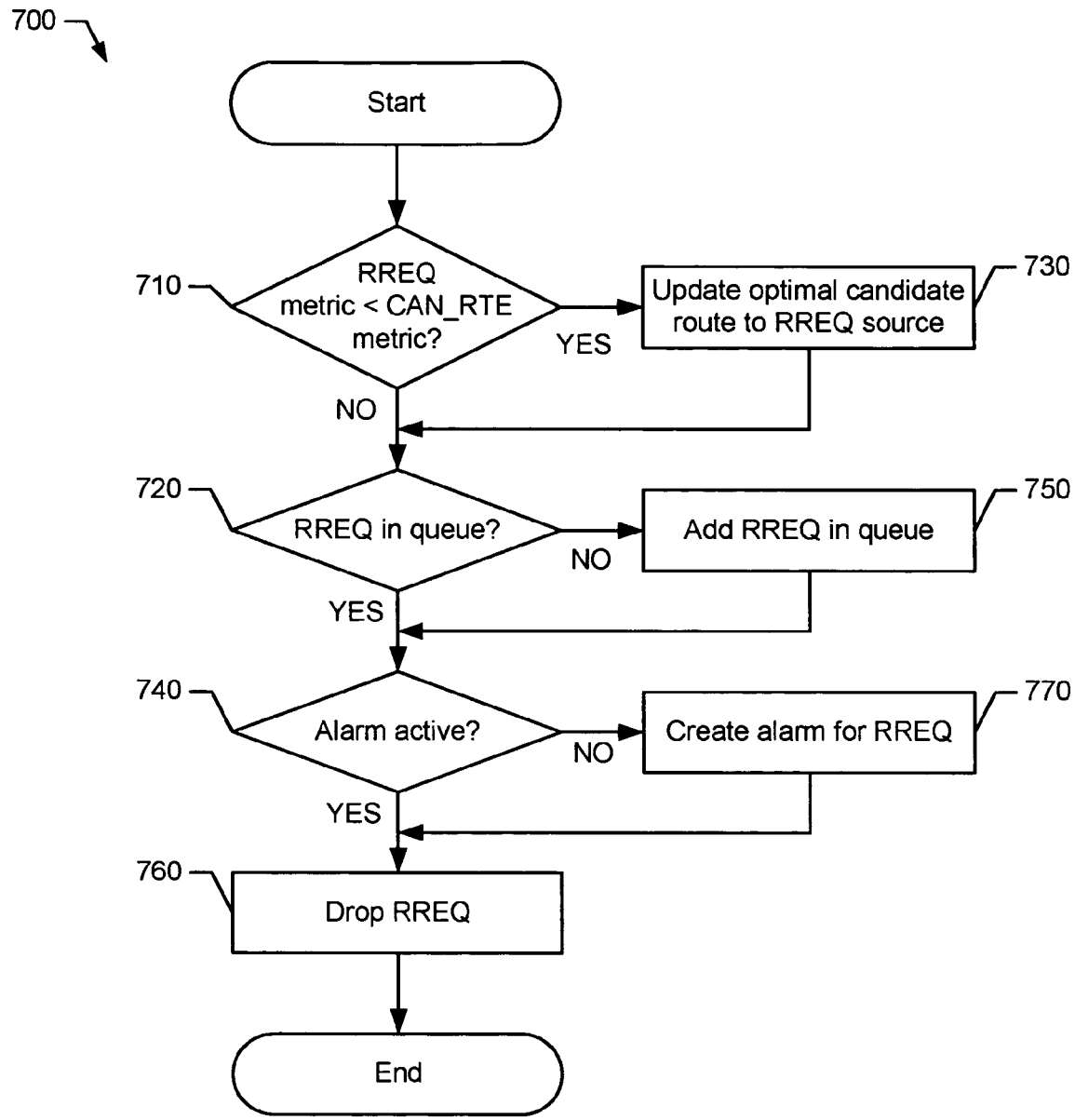
FIG. 11 depicts one manner in which the example communication node of FIG. 6 may be configured to further process the route request.

If the previous hop is not the next hop of the current route to the RREQ source, the communication node 200 may proceed to process 700 of FIG. 11. In the example of FIG. 11, the process 700 may begin with the communication node 200 determining whether a valid candidate route to the RREQ source (CAN_RTE) exists (block 710). In particular, the communication node 200 may compare the metric values of the RREQ and a candidate route (e.g., RREQ metric and CAN_RTE metric, respectively). If RREQ metric is not less than CAN_RTE metric, the communication node 200 may proceed to directly to block 720 as described in detail below.

Otherwise, if RREQ metric is less than CAN_RTE metric, the communication node 200 may update the candidate route to the RREQ source based on the RREQ (block 730). That is, the current candidate route may be replaced by a new candidate route based on the RREQ as the optimal candidate route to the RREQ source.

Accordingly, the communication node 200 may proceed to block 720 determine whether the RREQ is stored in the RREQ queue 245. If the RREQ is stored in the RREQ queue 245, the communication node 200 may proceed directly to block 740 as described in detail below. Otherwise if the RREQ is not stored in the RREQ queue 245, the communication node 200 may store the RREQ in the RREQ queue 245 (block 750) and proceed to block 740.

At block 740, the communication node 200 may determine whether an RREQ alarm is active for the RREQ. If an RREQ alarm is active for the RREQ, the communication node 200 may proceed directly to block 760 to drop the RREQ and terminate the process 700. Otherwise if an RREQ alarm is not active for the RREQ at block 740, the communication node 200 may generate an RREQ alarm for the RREQ (block 770) and proceed to block 760. Accordingly, the process 700 may terminate and control may return to the process 600.

Figure 12:
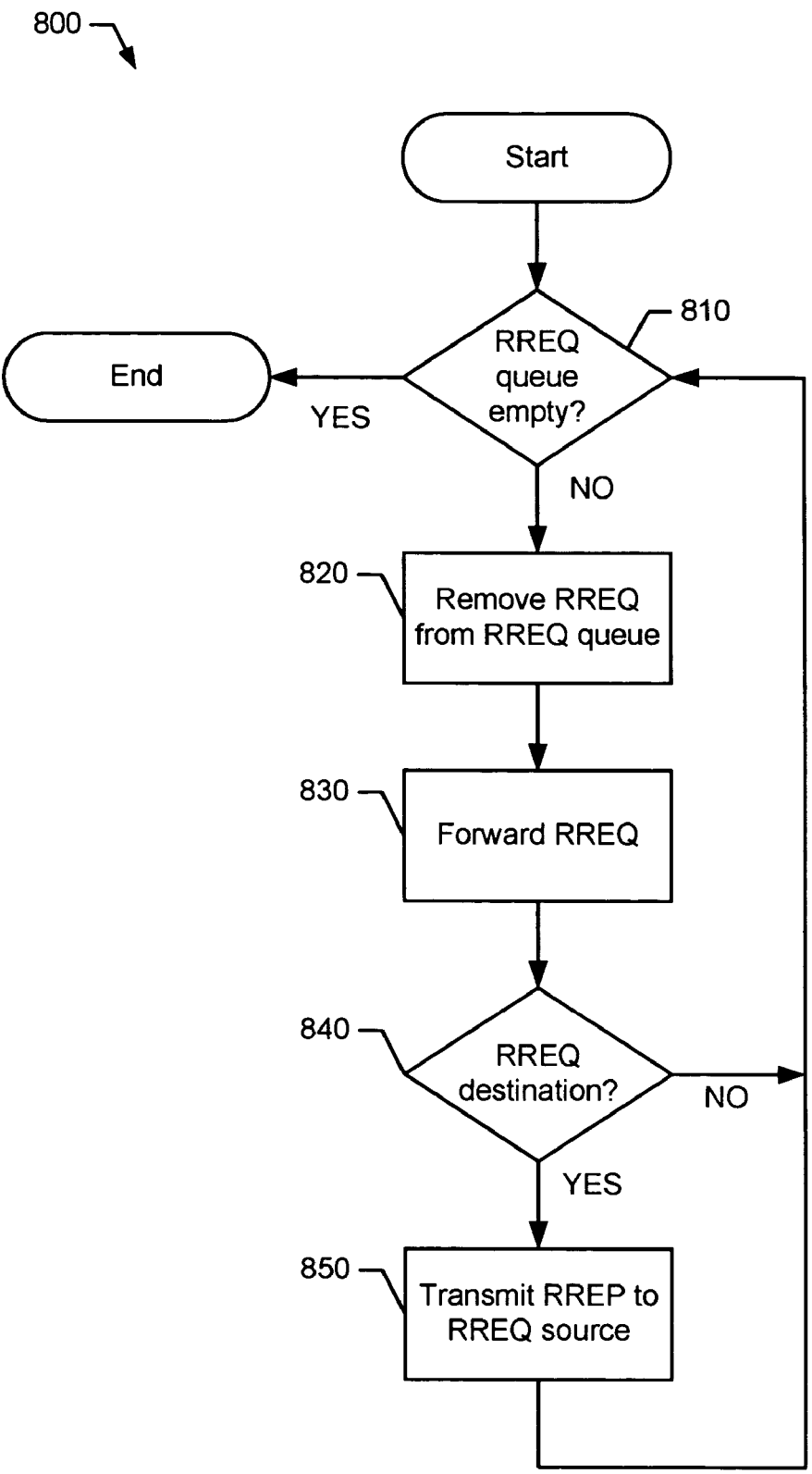
FIG. 12 depicts one manner in which the example communication node of FIG. 6 may be configured to further process the route request.

In the example of FIG. 12, the process 800 may begin with the communication node 200 determining whether the RREQ queue 245 is empty (block 810). If the RREQ queue 245 is empty, the communication node 200 may terminate the process 800. Otherwise if the RREQ queue 245 includes one or more RREQs, the communication node 200 may remove an RREQ from the RREQ queue 245 in a first-in-first-out (FIFO) manner to process (block 820). Accordingly, the communication node 200 may forward the RREQ to other mesh nodes of the wireless mesh network 100 (block 830).

The communication node 200 may also determine whether the communication node 200 is the RREQ destination (block 840). If the communication node 200 is the RREQ destination, the communication node 200 may initiate an RREP and transmit the RREP to the RREQ source via a unicast transmission (block 850). Accordingly, the communication node 200 may return to block 810 to process, if any, other RREQs in the RREQ queue 240. Otherwise if the communication node 200 determines that the communication node 200 is not the RREQ destination at block 840, the communication node 200 may return directly to block 810.

Turning back to block 630 of FIG. 10, if the previous hop is the next hop of the current route to the RREQ source, the communication node 200 may determine whether the current candidate route to the RREQ source is valid (block 640). In particular, the communication node 200 may compare the metric values of the RREQ and the current candidate route (e.g., RREQ metric and CAN_RTE metric, respectively). If RREQ metric is less than CAN_RTE metric (e.g., the current candidate route is invalid), the communication node 200 may update the optimal route to the RREQ source based on the RREQ (block 620) and proceed to the process 400 of FIG. 4 as described above. Otherwise if RREQ metric is not less than CAN_RTE metric (e.g., the current candidate route is valid), the communication node 200 may determine whether the sequence number of the RREQ (RREQ_SEQ) is greater than the sequence number of the current candidate route (CAN_SEQ) (block 650).

If RREQ_SEQ is greater than CAN_SEQ, the communication node 200 may update the current route to the RREQ source based on the RREQ (block 620) and proceed to the process 400 of FIG. 4 as described above. Otherwise if RREQ_SEQ is not greater than CAN_RTE_SEQ, the communication node 200 may determine whether RREQ_SEQ is equal to CAN_RTE_SEQ (block 660).

If RREQ_SEQ does not equal to CAN_RTE_SEQ, the communication node 200 may terminate the process 600 and control may return to the process 500. If RREQ_SEQ is equal to CAN_RTE_SEQ, the communication node 200 may compare the metric values of the RREQ and the current candidate route (e.g., RREQ metric and CAN_RTE_SEQ metric, respectively) (block 670). If RREQ metric is less than or equal to CAN_RTE_SEQ metric, the communication node 200 may update the current route to the RREQ source based on the RREQ (block 620) and proceed to the process 400 of FIG. 8 as described above. Otherwise if RREQ metric not less than or equal to CAN_RTE_SEQ metric, the communication node 200 may identify the current candidate route as the optimal route to the RREQ source (block 680). Accordingly, the communication node 200 may proceed to the process 400 of FIG. 8 as described above.

Referring back to block 560 of FIG. 9, if RREQ_SEQ is not greater than RTE_SEQ, the communication node 200 may determine whether the RREQ was transmitted before (block 570). If the RREQ was transmitted before, the communication node 200 may terminate the process 500 and control may return to block 340 of FIG. 3 to drop the RREQ. Otherwise, if the RREQ was not transmitted before, the communication node 200 may proceed to the process 400 of FIG. 8 as described above.

Figure 13:
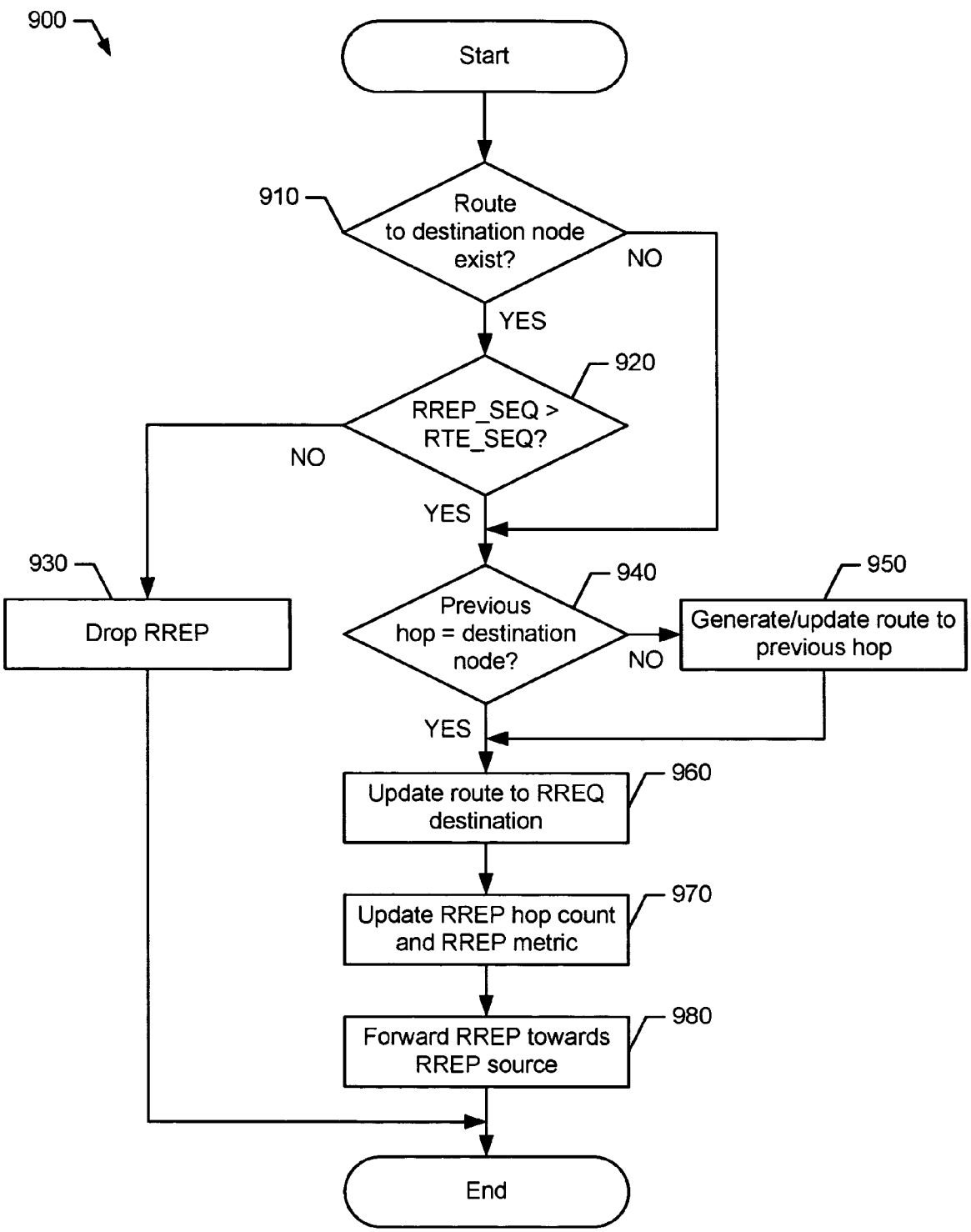
FIG. 13 is a flow diagram representation of one manner in which the example communication node of FIG. 6 may be configured to process a route reply.

In addition to processing a route request (RREQ), the communication node 200 may also process a route reply (RREP). In the example of FIG. 13, the process 900 may begin with the communication node 200 receiving a RREP and determining whether a route to the RREQ destination exists (e.g., the destination node 140) (block 910). If there is no route to the RREQ destination, the communication node 200 may proceed directly to block 940 as described in detail below. If there is a current route to the RREQ destination (RTE), the communication node 200 may determine whether the RREP is new (block 920). For example, the communication node 200 may determine whether the sequence number of the RREP (RREP_SEQ) greater than the sequence number of the current route to the destination node (RTE_SEQ). If the RREP_SEQ is less than or equal to the RTE_SEQ, the communication node 200 may drop the RREP (block 930) and terminate the process 900. Otherwise if the RREP_SEQ is greater than the RTE_SEQ at block 920, the communication node 200 may determine whether the previous node is the destination node (block 940).

If the previous hop is not the RREQ destination, the communication node 200 may generate a new route or update an existing route to the previous hop (block 950). The communication node 200 may also update the route to the RREQ destination (block 960). Further, the communication node 200 may update information associated with the RREP such as hop count and metric values (block 970). Accordingly, the communication node 200 may forward the RREP towards the RREQ source (e.g., the source node 110) (block 980).

Otherwise if the previous hop is the RREQ destination block 940, the communication node 200 may proceed directly to block 960. In a similar manner as described above, the communication node 200 may update the current route to the RREQ destination (block 960) and information associated with the RREP (block 970). Accordingly, the communication node 200 may forward the RREP towards the RREQ source (block 980).

Figure 14:
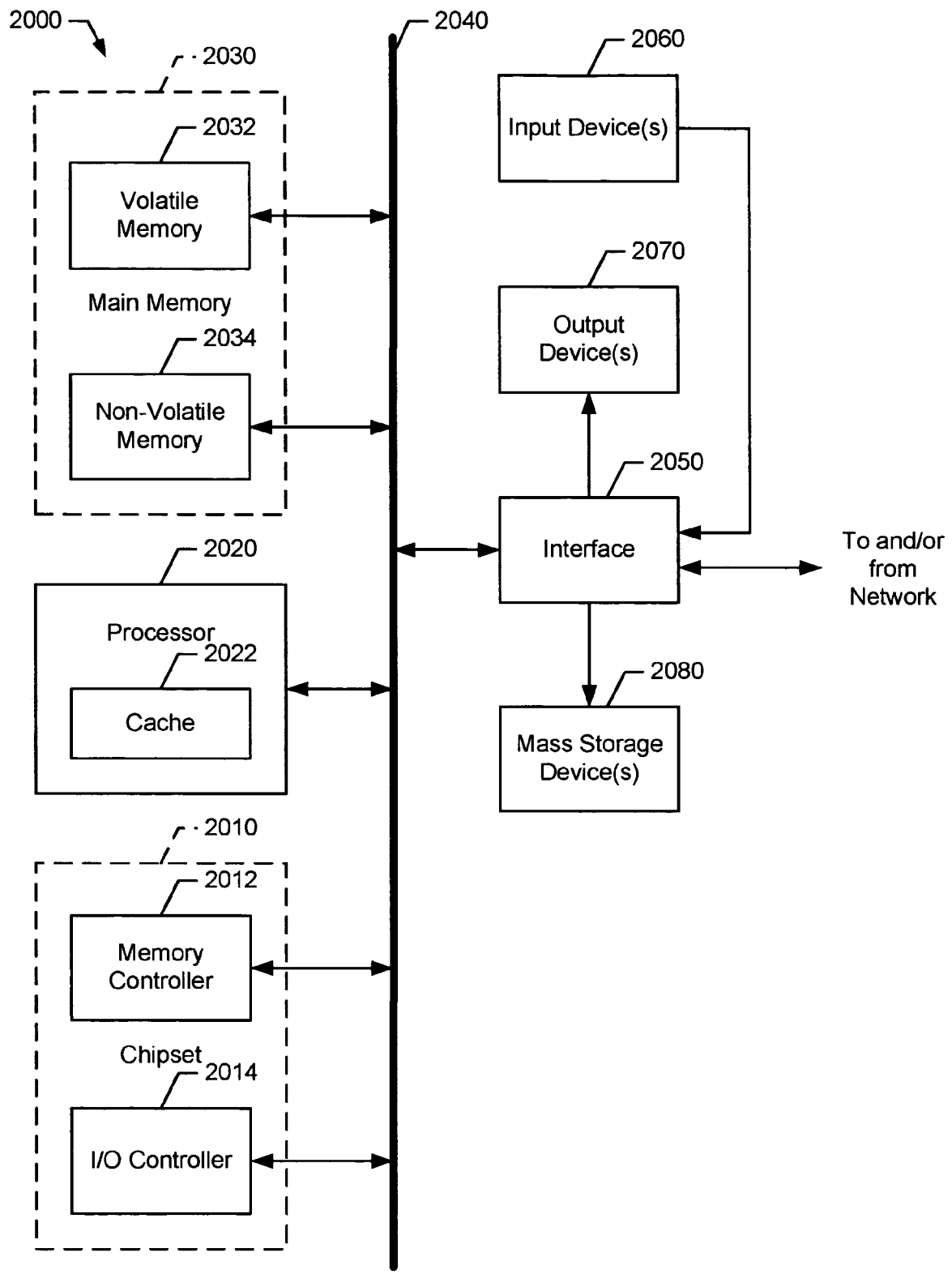
FIG. 14 is a block diagram representation of an example processor system that may be used to implement the example communication node of FIG. 6.

FIG. 14 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 14 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s)

2060, the output device(s) 2070, the mass storage device(s) 2080 and/or the network via the bus 2040 and the interface circuit 2050.

While the components shown in FIG. 14 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    receiving, by a destination node, a first route request from a source node over a plurality of routes between the source node and the destination node, the first route request being one of a sequence of route requests sequentially transmitted by the source node, each of the routes including one or more intermediate nodes between the source node and the destination node, the first route request received over each of the plurality of routes being associated with corresponding metric information indicating characteristics and/or conditions of the corresponding route;
    selecting, by the destination node, a first route and a second route from the plurality of routes as a current route and a candidate route, respectively, the current route being selected for communication between the source node and the destination node, the candidate route being selected as a possible replacement of the current route, the selection of the current route and the candidate route being done based at least in part on the plurality of metrics associated with the first route request received over the corresponding plurality of routes;
    receiving, by the destination node, a second route request over one or more of the plurality of routes and a third route request over one or more of the plurality of routes, the second and the third route requests being two of the sequence of route requests sequentially transmitted by the source node, the second route request being sequenced after the first request, and the third route request being sequenced after the second route request, with one or more intervening route requests sequenced in between the second and the third route requests;
    first determining, by the destination node, that the second, the third, and the one or more intervening route requests have not been received over the first route;
    second determining, by the destination node, that the number of the one or more intervening route requests exceeds a threshold number; and
    replacing, by the destination node, the first route with the second route as the current route based at least in part on said first determining and said second determining.

2. The method of claim 1, further comprising:
    receiving, by the destination node, a plurality of route requests of the sequence of route requests, in addition and subsequent to the first, second and third route requests, over one or more of the plurality of routes; and
    adaptively updating, by the destination node, the selection of the current route and the candidate route based at least in part on metric information associated with each of the plurality of route requests received over a respective route.

3. The method of claim 1, further comprising:
    generating, by the destination node, a route reply and transmitting the route reply to the source node via a unicast transmission.

4. The method of claim 1, wherein the source node, the destination node and the intermediate nodes comprises mesh nodes associated with a wireless mesh network.

5. The method of claim 1, further comprising:
    receiving, by the destination node, the second, the third, and the one or more intervening route requests over the second route.

6. An apparatus comprising:
    a communication interface configured to receive a first route request from a source node over a plurality of routes between the source node and the apparatus, the first route request being one of a sequence of route requests sequentially transmitted by the source node, each of the routes including one or more intermediate nodes between the source node and the apparatus, the first route request received over each of the plurality of routes being associated with corresponding metric information indicating characteristics and/or conditions of the corresponding route; and
    an identifier coupled to the communication interface to identify a first route and a second route from the plurality of routes as a current route and a candidate route, respectively, the current route being identified for communication between the source node and the apparatus, the candidate route being selected as a possible replacement of the current route, the identification of the current route and the candidate route being done based at least in part on the plurality of metrics associated with the first request received over the corresponding plurality of routes;
    wherein the communication interface is further configured to receive a second route request over one or more of the plurality of routes and a third route request over one or more of the plurality of routes, the second route request and the third route request being two of the sequence of route requests sequentially transmitted by the source node, the second route request being sequenced after the first route request, and the third route request being sequenced after the second route request, with one or more intervening route requests sequenced in between the second and the third route requests; and
    wherein the identifier is further configured to:
        first determine that the second, the third route, and the one or more intervening route requests have not been received over the first route,
        second determine that the number of the one or more intervening route requests exceeds a threshold number, and replace the first route with the second route as the current route based at least in part on said first determining and second determining.

7. The apparatus of claim 6,
wherein the communication interface is further configured to receive a plurality of route requests of the sequence of route requests, in addition and subsequent to the first, second and third route requests, over one or more of the plurality of routes; and
wherein the identifier is further configured to adaptively update the identification of the current route and the candidate route based at least in part on metric information associated with each of the plurality of route requests received over a respective route.

8. The apparatus of claim 6, further comprising:
a controller configured to generate a route reply and transmit the route reply to the source node via a unicast transmission.

9. The apparatus of claim 6, wherein the apparatus, the destination node and the intermediate nodes comprises mesh nodes associated with a wireless mesh network.

10. The apparatus of claim 6, wherein the communication interface is further configured to receive the second, the third, and the one or more intervening route requests over the second route.

* * * * *

UNITED STATES PATENT AND TRADEMARK OFFICE
CERTIFICATE OF CORRECTION

PATENT NO. : 7,570,628 B2  Page 1 of 1
APPLICATION NO. : 11/124004
DATED : August 4, 2009
INVENTOR(S) : Rangarajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 998 days.

Signed and Sealed this

Seventh Day of September, 2010

David J. Kappos
*Director of the United States Patent and Trademark Office*